United States Patent
Bordoni

(10) Patent No.: US 10,145,253 B2
(45) Date of Patent: Dec. 4, 2018

(54) STATOR VANE FORMED BY A SET OF VANE PARTS

(71) Applicant: SAFRAN AIRCRAFT ENGINES, Paris (FR)

(72) Inventor: Nils Bordoni, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 204 days.

(21) Appl. No.: 14/389,433

(22) PCT Filed: Apr. 4, 2013

(86) PCT No.: PCT/FR2013/050747
§ 371 (c)(1),
(2) Date: Sep. 30, 2014

(87) PCT Pub. No.: WO2013/150248
PCT Pub. Date: Oct. 10, 2013

(65) Prior Publication Data
US 2015/0315923 A1    Nov. 5, 2015

(30) Foreign Application Priority Data

Apr. 5, 2012 (FR) .................................. 12 53143
Apr. 5, 2012 (FR) .................................. 12 53145
Apr. 5, 2012 (FR) .................................. 12 53146

(51) Int. Cl.
*F01D 9/06* (2006.01)
*F01D 9/02* (2006.01)
(Continued)

(52) U.S. Cl.
CPC ............... *F01D 9/065* (2013.01); *F01D 9/02* (2013.01); *F01D 9/04* (2013.01); *F01D 25/04* (2013.01);
(Continued)

(58) Field of Classification Search
CPC ... F01D 9/065; F01D 9/06; F01D 9/02; F01D 9/04; F01D 25/12; F01D 25/08; F02K 3/06; F05D 2220/30; F05D 2240/12
(Continued)

(56) References Cited

U.S. PATENT DOCUMENTS 5,203,163 A    4/1993  Parsons
6,430,931 B1   8/2002  Horner
(Continued)

FOREIGN PATENT DOCUMENTS

EP    0 911 505 A2    4/1999
EP    0 911 505 A3    4/1999
(Continued)

OTHER PUBLICATIONS

International Search Report dated Jul. 22, 2013, in PCT/FR2013/050747, filed Apr. 4, 2013.

*Primary Examiner* — Jason Shanske
*Assistant Examiner* — Michael Sehn
(74) *Attorney, Agent, or Firm* — Oblon, McClelland, Maier & Neustadt, L.L.P.

(57) ABSTRACT

A stator vane for a turbine machine includes a set of vane parts arranged relative to each other to define air flow stream paths between vane parts, and a mechanism circulating a fluid to be cooled by the air flow.

8 Claims, 7 Drawing Sheets

(51) Int. Cl.
*F01D 25/04* (2006.01)
*F01D 9/04* (2006.01)
*F01D 25/12* (2006.01)
*F02K 3/06* (2006.01)

(52) U.S. Cl.
CPC ............... *F01D 25/12* (2013.01); *F02K 3/06* (2013.01); *F05D 2220/30* (2013.01); *F05D 2240/12* (2013.01); *F05D 2260/20* (2013.01); *F05D 2260/213* (2013.01); *F05D 2260/22141* (2013.01); *Y02T 50/676* (2013.01)

(58) Field of Classification Search
USPC ...................................................... 415/208.1
See application file for complete search history.

(56) References Cited

U.S. PATENT DOCUMENTS

| | | |
|---|---|---|
| 2003/0029158 A1 | 2/2003 | Horner |
| 2005/0100438 A1 | 5/2005 | Trewin et al. |
| 2006/0228208 A1 | 10/2006 | Trewin et al. |
| 2008/0134685 A1* | 6/2008 | Bunker ............ F01D 5/146 60/776 |
| 2009/0104028 A1 | 4/2009 | Trewin et al. |
| 2009/0220348 A1* | 9/2009 | Routier ............ F01D 5/146 416/237 |
| 2010/0158684 A1* | 6/2010 | Baralon ........... F01D 5/146 415/208.1 |
| 2010/0300066 A1* | 12/2010 | Bulin .............. F01D 9/065 60/267 |
| 2011/0268562 A1* | 11/2011 | Knight, III ........ F01D 5/18 415/179 |

FOREIGN PATENT DOCUMENTS

| | | |
|---|---|---|
| EP | 1 529 927 A2 | 5/2005 |
| EP | 1 529 927 A3 | 5/2005 |
| EP | 2 383 437 A2 | 11/2011 |
| FR | 2 917 714 A1 | 12/2008 |

* cited by examiner

STATOR VANE FORMED BY A SET OF VANE PARTS

TECHNICAL FIELD

This invention relates to the field of turbine machines and particularly heat exchangers installed in aircraft turbine machines. The invention also relates to the field of stator vanes installed in such turbine machines. It relates more particularly to a stator vane for a turbine machine, and an outlet guide vane (OGV) system and a turbine machine comprising such a stator vane.

The invention is applicable to all types of land-based and aeronautical turbine machines, and particularly aircraft turbine machines such as turbojets and turboprops.

STATE OF PRIOR ART

Ongoing studies and possible changes to turbojets to increase the dilution ratio are considering the use of rotation speed reduction gears to drive the fan in rotation. This is also the case for turboprops for the connection between the engine and the fan. Such speed reduction gears can make the fan turn at a lower speed than the low pressure compressor, for example, to improve the efficiency.

These speed reduction gears transmit high powers and heating of reduction gear components causes the release of a large quantity of heat that is dissipated in the closed circuit for circulation of lubrication oil in internal structures in the turbojet. Thus efficient cooling of the lubrication circuit oil is necessary to be able to maintain an acceptable temperature. The thermal power dissipated in an engine in which a speed reduction gear is installed is about three times as high as the power dissipated in a conventional engine. This heat is evacuated through a high oil flow.

It is already known that oil can be cooled by oil/fuel heat exchangers that heat the fuel supplied to the engine and/or oil/air heat exchangers.

The dissipation capacity of oil/fuel heat exchangers (Fuel Cooling Oil Cooler—FCOC) is limited by the fuel flow. Consequently, this type of exchanger cannot significantly increase the heat dissipation capability.

Air Cooled Oil Coolers (ACOC) can achieve a large heat dissipation capacity considering the high air flow. Two types of these oil/air exchangers are usually used and are described in detail below.

Surface coolers have a generally rectangular area on one side of which oil flow channels are fixed, while metallic air flow strips (or fins) may be fixed on the other side. Heat can thus be transferred from hot oil to the metal strips by heat conduction and these strips are cooled in contact with air. This type of exchanger is usually placed directly on the walls of the flow stream. The efficiency of this type of exchanger is low if no fins are provided for the air flow due to a low heat exchange surface area. When fitted with fins, the exchanger has a higher oil cooling efficiency but in this case aerodynamic drag is strongly increased.

Brick coolers conventionally consist of a stack of metal plates through which the fluid to be cooled passes. These plates are at intervals from each other and metal strips are placed between these plates that are usually welded. The plates are supplied with fluid through distribution pipes orthogonal to these plates. The oil and air circuits remain segregated. The assembly is placed in an air flow, either directly in the flow stream or in a channel supplied by a scoop. The presence of metal plates inside which the fluid circulates and the presence of distribution pipes and fins in the air flow creates a strong aerodynamic drag.

Despite the disadvantages mentioned above applicable to surface exchangers and brick coolers, increasing heat dissipation needs for turbojets fitted with speed reduction gears make their use necessary, and thus exchangers have to be designed accordingly, for example by an installation with more and/or larger coolers.

However, this creates several constraints and disadvantages. Bad positioning of exchangers, for example in an unguided flow for example between the fan and the Outlet Guide Vanes (OGV) can create high pressure losses in the air flow and reduce turbojet performances. Therefore possible layouts of the exchangers are reduced and they are often positioned downstream from the outlet guide vanes OGV. However, the dimension of the exchangers causes many difficulties during installation and it is very often necessary to free spaces in the flow stream. In general, this is done by eliminating acoustic treatment surfaces, which increases acoustic emissions from the turbojet.

PRESENTATION OF THE INVENTION

The purpose of the invention is to at least partially correct the disadvantages mentioned above dealing with embodiments according to prior art.

In particular, the purpose of the invention is to increase the heat dissipation capacity without correspondingly affecting the performances of a turbine machine.

Thus, the purpose of one of the aspects of the invention is a stator vane for a turbine machine characterised in that it is composed of a set of vane parts arranged relative to each other to define air flow stream paths between the vane parts, and in that it comprises means of circulating a fluid, particularly oil, to be cooled by said air flow.

The air flow paths can thus at least partially dissipate heat from the fluid to be cooled.

With this invention, existing surfaces of the turbine machine can be used, and particularly stator guide vane surfaces, to dissipate heat, thus avoiding or limiting the addition of coolers according to prior art. The invention can thus reduce the size and improve the aerodynamic profile. In particular, the invention makes it possible to install the heat exchanger function at the outlet guide vanes OGV. The division of the vane, and particularly an outlet guide vane OGV, into several parts can increase the exchange surface area while limiting the magnitude of aerodynamic drag due to the aerodynamic shapes of the vane. The invention can also avoid the need to add fins or other devices that increase heat exchange but also increase aerodynamic drag. Finally, the invention can more generally increase aerodynamic and acoustic performances of the turbine machine.

The stator vane according to the invention may also comprise one or several of the following characteristics considered individually or in any technically possible combination.

The stator vane may be a guide vane, and particularly an outlet guide vane OGV.

The vane parts can be arranged to form a multi-profile stator vane, particularly acting as a heat exchanger to cool the fluid using the air flow. The use of vane parts can significantly increase the vane exchange surface area while limiting the impact on aerodynamic performances of the vane.

The vane parts can form different aerodynamic profiles and can guide the air flow.

The means of circulating the fluid to be cooled can be arranged to enable fluid circulation close to the vane surfaces so as to dissipate heat from the fluid.

The vane surfaces are preferably not provided with devices for increasing the heat exchange, for example fins. Vane surfaces are preferably not treated acoustically such that acoustic performances of the turbine machine are not affected.

Each vane part may be superposed orthoradially, on at least one other vane part, for example two other vane parts. The intervals between the vane parts may define air flow paths.

The vane parts may be arranged such that when observed in a plane orthogonal to the longitudinal direction of the vane or in a top view of the free end of the vane, the aerodynamic profile of the vane is almost identical to the aerodynamic profile of a stator vane known in itself comprising a leading edge, a relatively thick median section and a thinner trailing edge.

As a variant, the layout of the vane parts may be different and chosen so as to improve the aerodynamic properties of the vane.

Thus, the number, shape, geometry and relative positions of the vane parts may vary, particularly being adapted as a function of the required performances for the turbine machine.

The vane may comprise at least three vane parts, the first and second vane parts combined at least partially defining the leading edge and the median section of the aerodynamic profile of the vane and the third vane part combined at least partially defining the trailing edge of the aerodynamic profile of the vane. In particular, the leading edge of the vane may be defined by ends of the first and second vane parts. The trailing edge of the vane may be defined by one end of the third vane part.

The spacing between two consecutive vane parts may be identical for all vane parts.

At least one vane part, and preferably all vane parts, may have approximately the same aerodynamic profile as a lift surface.

The vane may comprise one or several support sections, distributed particularly over the height of the vane, to mechanically retain the vane parts to each other.

Means of circulating the fluid to be cooled may comprise fluid flow channels formed on at least part of the vane, and even better on all vane parts, covered by a cover plate defining an external surface of the vane part.

The means of circulating the fluid to be cooled may comprise fluid circulation pipes located on at least part of the vane, the circulation pipes in particular enabling fluid distribution in the flow channels.

The stator vane may particularly be an outlet guide vane OGV. Solutions envisaged for outlet guide vanes OGV may appear to give preference to the use of large chord vanes that have a higher thickness. The stator vane according to the invention may advantageously be adapted to a large chord vane.

Another purpose of the invention according to another of its aspects is a stator part for a turbine machine comprising a stator vane, characterised in that it also comprises:
- a set of strips associated with said stator vane, the strips and said stator vane being arranged relative to each other to define air flow stream paths between them, means of circulating a fluid to be cooled by said air flow.

The air flow paths may thus be capable of at least partially dissipating heat from the fluid to be cooled.

Part of the stator may comprise any one of the previously mentioned characteristics, taken alone or in any technically possible combination with other characteristics.

In particular, the stator part may comprise a stator vane like that defined above formed from a set of vane parts arranged relative to each other to define air flow stream paths between the vane parts, and comprising means of circulating a fluid, and particularly oil, to be cooled by said air flow.

The presence of a set of strips associated with the stator vane to form the stator part may increase the exchange area while limiting the magnitude of the aerodynamic drag by means of aerodynamic shapes of the vane. In particular, the stator part may have a main cross-section comparable to that of a conventional stator vane, for example an outlet guide vane OGV. The aerodynamic drag of the stator part may also be less than the aerodynamic drag of an assembly formed by a conventional outlet guide vane OGV associated with a conventional heat exchanger.

The stator part may be located at a conventional position on a conventional stator vane, particularly a guide vane, of a turbine machine.

The stator vane may be in the same shape as a conventional vane of a turbine machine. The stator vane may for example be a guide vane, and particularly an outlet guide vane OGV.

The strips may be made so as to minimise the resulting aerodynamic drag. Strips may be in the form of curved plates.

The set of strips may comprise at least two strips, and better three or even four or even better five strips, for example between two and six strips.

The strips may all be the same length along the direction of the radial axis of the turbine machine. As a variant, at least two strips or even all strips may have different lengths. For example, the length of the strips may increase as the distance from the stator vane increases.

The strips may at least partially and preferably entirely extend along curved surfaces parallel to each other, or curved lines parallel to each other when the strips are observed in an orthoradial plane. The strips may also extend at least partially and preferably entirely in the orthoradial plane along curved lines parallel to the curved line along which the stator vane extends.

The strips may be oriented along radial directions rather than parallel to the stator vane. In this way, it may be possible to improve the capability of the stator part according to the invention to be repeated circularly, particularly when there is a large number of strips.

The strips may be longer in the radial direction than the stator vane.

The stator strips and/or vane may comprise a metallic material, for example a metal alloy, for example an aluminium and/or titanium alloy. Different or identical materials may be used to make the strips. Similarly, the material used for the stator vane may be identical to or different from the material used for the strips.

The stator vane and the strips may be at a distance from each other, particularly at the same constant distance or spacing, the spacing distances defining the air flow stream paths. The spacing between the strips may or may not be variable. The strips may be separated from each other by the same distance, that may or may not be the same as the distance between the stator vane and the strip adjacent to it.

At least some of the strips, or particularly all the strips, may have an approximately constant thickness.

Each strip may have a leading edge, a median section and a trailing edge. The thickness of each strip may be approximately constant on the leading edge and the median section, and may then decrease at the trailing edge.

The thickness of each strip may be less than the average thickness of the stator vane.

At least two strips may be arranged relative to the stator vane such that there is at least one plane passing through at least the stator vane and said at least two strips. Said at least one plane may be parallel to the plane perpendicular to the chord of the stator vane and containing the median line of the chord of the stator vane.

The strips may be inscribed in an angular sector of which the bissector is approximately coincident with the median line of the chord of the stator vane.

The strips may be approximately the same length in an orthoradial plane and they may be homothetically distributed relative to the stator vane.

The means of circulating the fluid to be cooled may comprise fluid circulation pipes extending in the stator vane and passing through the strips. The pipes may pass inside the stator vane from one radial end to the other.

The means of circulating the fluid to be cooled may be fixed to the strips particularly by welding, so that a heat flux can be transferred by conduction.

The stator vane can allow the radial path of circulation pipes for the fluid to be cooled in the flow stream.

At least a segment of the pipes may be located at a radial end of the strips such that it is outside the flow stream to prevent the creation of aerodynamic drag.

In particular, the pipes may be distributed radially on several stages. For example, pipes may be distributed radially on at least three stages, for example two stages being located outside the flow stream and one median stage being located in the flow stream.

Fairing may also be provided around the circulation pipes for the fluid to be cooled to limit aerodynamic drag. In particular, fairing structures may cover the circulation pipes. The fairing structures may provide mechanical support to hold all strips together.

Another purpose of the invention according to one of these aspects is a stator part for a turbine machine comprising a stator vane, characterised in that it also comprises:
- a heat conducting structure at which an air flow comes into contact, arranged on the stator vane,
- means of circulating the fluid to be cooled by said heat conducting structure on contact with said air flow,
- an aerodynamic element with an aerodynamic profile, at which said heat conducting structure is arranged.

The stator part may comprise any one of the above-mentioned characteristics taken alone or in any technically possible combination with other characteristics.

In particular, the stator part may comprise a stator vane as disclosed above, formed from a set of vane parts arranged relative to each other to define air flow stream paths between the vane parts and comprising means of circulating a fluid to be cooled, and particularly oil, by said air flow.

The air flow stream in contact with the heat conducting structure, particularly flowing through the heat conducting structure, can at least partially dissipate the heat from the fluid to be cooled. Heat exchange by conduction between the fluid to be cooled and the air stream may be greater and heat dissipated may be higher when the exchange surface area of the heat conducting structure is large.

The exchange surface area by heat conduction provided by the heat conducting structure may increase the capacity for heat exchange between the air flow and the fluid to be cooled.

The aerodynamic element can at least partially support the heat conducting structure while also participating in the guidance of the air flow due to its aerodynamic profile. In this way, the presence of the aerodynamic element may possibly reduce the total number of stator vanes necessary to guide the flow, for example the total number of outlet guide vanes OGV.

The stator part may be located at a conventional location on a stator vane, and particularly a conventional guide vane of a turbine machine.

The stator vane and/or the aerodynamic element may be in the form of a conventional vane of a turbine machine. For example, the stator vane and/or the aerodynamic element may be a guide vane, and particularly an outlet guide vane OGC.

The stator part may act like a heat exchanger for cooling the fluid by means of the air flow. The use of the heat conducting structure can increase the exchange surface area significantly while limiting the impact on aerodynamic performances.

Circulation means for the fluid to be cooled may be arranged to enable circulation of the fluid close to the surfaces of the stator vane and/or the aerodynamic element so as to dissipate heat from the fluid.

The aerodynamic element may be superposed orthoradially on the stator vane. Similarly, the heat conducting structure may be superposed orthoradially on the stator vane and/or the aerodynamic element.

The aerodynamic element may have practically the same aerodynamic profile as a stator vane known in itself, comprising a leading edge, a relatively thick median section and a thinner trailing edge.

The layout of the stator vane, the heat conducting structure and the aerodynamic element may be chosen so as to improve the aerodynamic properties of the stator part.

Thus, the number, shape or geometry and relative position of each of the parts may vary, being adapted particularly depending on the required performances for the turbine machine.

The heat conducting structure may be fixed to the stator vane and/or the aerodynamic element.

The heat conducting structure may be located at least partially between the stator vane and the aerodynamic element. The position of the heat conducting structure between the stator vane and the aerodynamic element can protect said structure and particularly limit its exposure to Foreign Object Damage (FOD).

The heat conducting structure may comprise a set of heat conducting strips.

The layout of the strips relative to each other can define air flow stream paths. The strips may all be laid out symmetrically or non-symmetrically within the heat conducting structure. In particular, the layout of the strips within the heat conducting structure may or may not be regular.

The strips may be of any type. The strips may for example be heat conducting plates, with or without a curvature similar to the curvature of the stator vane and/or the aerodynamic element.

The strips may form hollow ducts inside which the air flow passes. The cross-section of such ducts may be arbitrary, and particularly circular, oval or polygonal, for example triangular, rectangular or square.

The strips may or may not have the same dimensions. The strips may or may not all comprise a heat conducting material.

The heat conducting structure may comprise at least four, and preferably six, or even more preferably eight strips or more.

The strips may comprise a material with high thermal conductivity. The high heat conduction capacity of the strips helps to significantly increase the heat dissipation efficiency of the stator part according to the invention. In particular, the strips may be metallic, for example comprising a metal alloy, for example an aluminium and/or titanium alloy. Different or identical materials may be used to make the strips.

The strips may be made and particularly sized to minimise the resulting aerodynamic drag, while maximising the heat dissipation capacity.

The distribution, shape and/or orientation of the strips may be different, for example chosen as a function of the required performances for the turbine machine.

In this application, the axial direction is the direction of the axis of rotation M of the turbine machine rotor, and a radial direction R is a direction perpendicular to the M axis. The terms "interior" and "exterior" are used with reference to a radial direction R such that the inner part (i.e. radially interior) of an element is closer to the M axis than the exterior part (i.e. radially exterior) of the same element.

The heat conducting structure may or may not be closed by an external surface and/or an internal surface. The external and/or internal surfaces of the heat conducting structure may extend in the external plane containing the external surface of the stator vane and/or the internal plane containing the internal surface of the stator vane, respectively.

The heat conducting structure may extend continuously. In particular, it may extend continuously between the stator vane and the aerodynamic element. In particular, the heat conducting structure may extend continuously from the lateral surface of the stator vane as far as the lateral surface of the aerodynamic element.

The stator vane may form a first stator vane and the aerodynamic element may be a second stator vane adjacent to the first stator vane.

In particular, the first stator vane and the second stator vane can thus be two adjacent stator vanes belonging to the same vane system, particularly an outlet guide vane OGV system. The heat conducting structure may be installed between these first and second stator vanes.

In this way, the invention can quickly and simply increase the heat dissipation capacity of stator vanes by adding a heat conducting structure, particularly by adding strips, between the two adjacent stator vanes to form a stator part according to the invention.

Preferably, the first and second stator vanes are close to each other, particularly being superposed at least partially orthoradially on each other.

The means of circulating the fluid to be cooled may comprise fluid flow channels at least partially formed inside the stator vane and/or inside the aerodynamic element.

The fluid path to be cooled inside the stator vane and/or inside the aerodynamic element help to limit aerodynamic drag. Furthermore, the association of smooth surfaces of the stator vane and/or the aerodynamic element with strips of the heat conducting structure in the same location can limit circuits of fluid to be cooled and optimise the use of the available exchange surfaces.

The means of circulating the fluid to be cooled may comprise fluid circulation pipes arranged on the stator vane and/or the aerodynamic element, particularly passing through the stator vane and/or the aerodynamic element and opening up on their inside surface and/or their outside surface, the circulation pipes being used to distribute fluid in the flow channels.

In particular, the flow channels can open up into circulation pipes, particularly inside the stator vane and/or the aerodynamic element.

Fluid flow ducts may be formed on the stator vane and/or the aerodynamic element and then covered by a cover plate.

Another purpose of the invention according to one of its aspects is an outlet guide vane (OGV) characterised in that it comprises a stator vane as defined above and/or a stator part as defined above.

Advantageously, unlike solutions according to prior art, the location of a stator vane and/or a stator part according to the invention at the outlet guide vane OGV system makes it possible to use existing surfaces of the turbine machine to dissipate heat, thus avoiding the addition of heat exchangers.

The result is a reduction in size and an improvement to the aerodynamic profile.

The division of an OGV vane into several parts also limits the magnitude of the aerodynamic drag due to the aerodynamic shapes of vane parts and there is no need to add fins to increase heat exchange.

In particular, the outlet guide vane system may comprise guide vanes all similar to the stator vane according to the invention and/or guide parts all similar to the stator part according to the invention.

The guide vane may comprise stator parts according to the invention distributed circularly around its entire periphery or only around part of its periphery depending on dissipation needs.

Another purpose of the invention according to another of its aspects is a turbine machine characterised in that it comprises a stator vane like that defined above and/or a stator part as defined above and/or an outlet guide vane (OGV) as defined above.

For example, the turbine machine may comprise a stator vane and/or a stator part according to the invention at any stage of the stator, particularly elsewhere than at the outlet guide vane (OGV) system.

Another purpose of the invention according to another of its aspects is a method of manufacturing a stator vane as defined above and/or a stator part as defined above, characterised in that it comprises the following steps:
 form flow channels for the fluid to be cooled, particularly oil, on at least part of a vane, particularly by machining a surface of the vane part,
 fix a cover plate, particularly a metal plate and particularly by welding, on the part of the vane so as to cover the flow channels formed.

The method may also comprise the step consisting of fixing circulating pipes of the fluid to be cooled on the vane part such that the pipes open up into flow channels, at least at one of their ends.

The cover plate may have high thermal conductivity.

The vane part and particularly the cover plate may comprise a metal material, particularly a metal alloy, for example an aluminium and/or titanium alloy. Different materials may be used to make the vane parts, and particularly the cover plate and other parts of the vane parts.

The cover plate may be fixed to the vane part by welding, for example by electron beam welding.

The outlet guide vane, the turbine machine and the method according to the invention may comprise any of the above-mentioned characteristics taken in isolation or in any technically possible combination with other characteristics.

BRIEF DESCRIPTION OF THE DRAWINGS

The invention will be better understood after reading the detailed description given below of non-limitative example embodiments of the invention and after examining the diagrammatic and partial figures of the appended drawing on which.

Identical references in all these figures may denote identical or similar elements.

DETAILED PRESENTATION OF PARTICULAR EMBODIMENTS

Figure 1A:
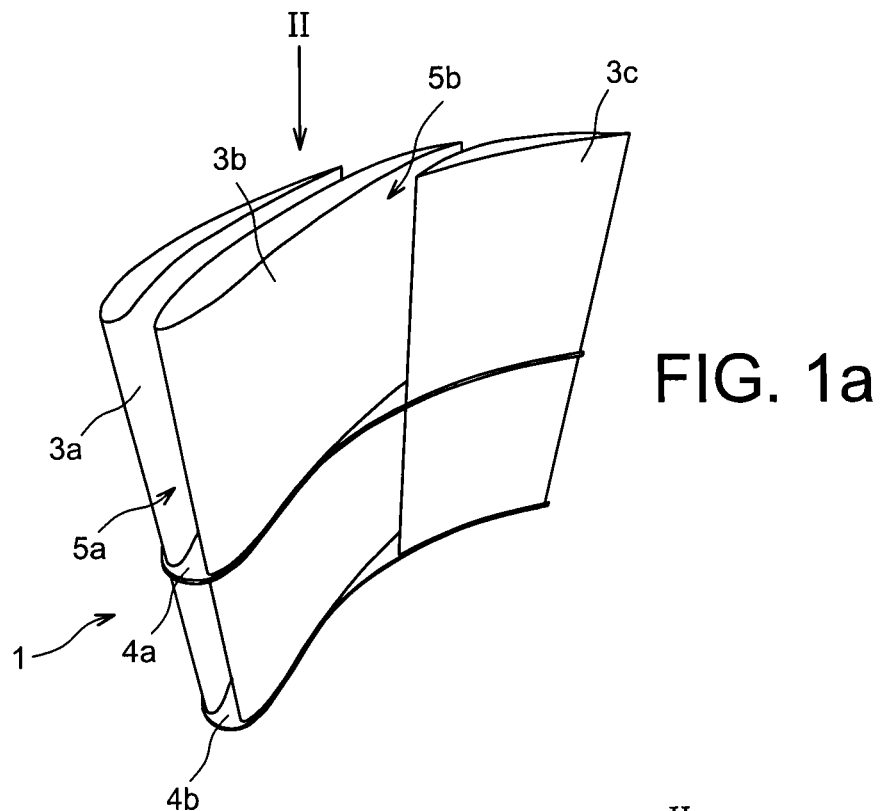
FIGS. 1a and 1b show two perspective views of an example stator vane according to the invention.
Figure 1B:
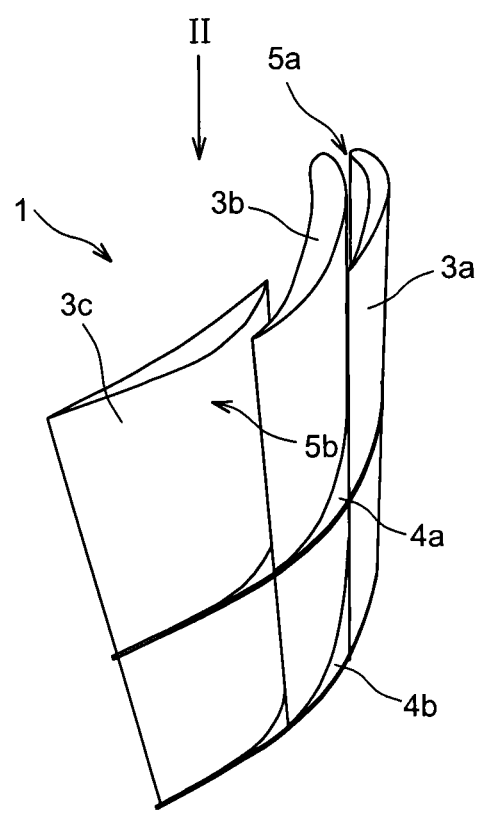

FIGS. 1a and 1b show a perspective view of an example stator vane 1 according to the invention.

The vane 1 comprises a set of three vane parts 3a, 3b and 3c arranged to form two air flow stream paths 5a and 5b between them to dissipate heat in a fluid to be cooled, and particularly oil in the lubrication circuit.

Figure 3:
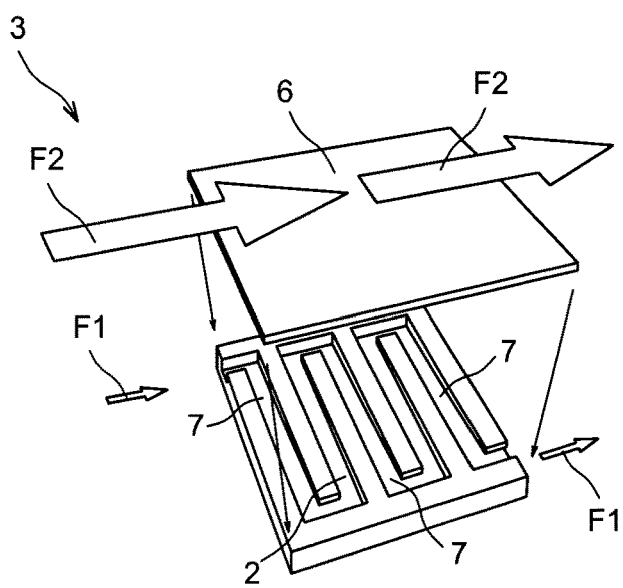
FIG. 3 shows partial manufacturing of the vane in FIGS. 1a and 1b to install means of circulating a fluid to be cooled.
Figure 4:
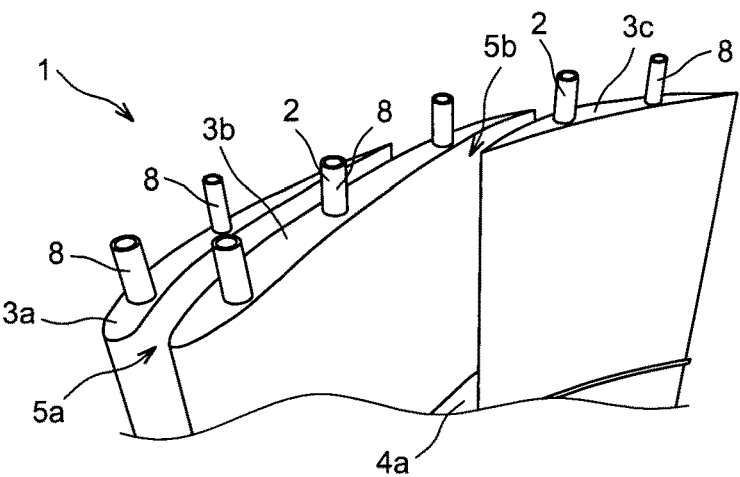
FIG. 4 shows a perspective view of the vane in FIGS. 1a et 1b provided with means of circulating a fluid to be cooled.

The vane 1 also comprises circulation means 2 for the oil to be cooled, visible in FIGS. 3 and 4. In particular, these circulation means 2 comprise oil flow channels 7 visible in FIG. 3, and oil circulation pipes 8 visible in FIG. 4.

Figure 2:
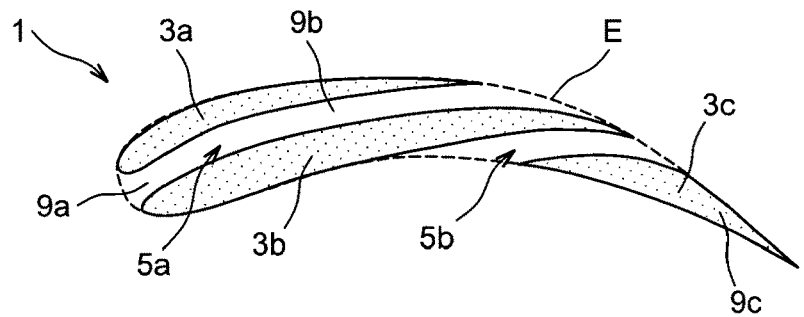
FIG. 2 is a view along II in FIGS. 1a and 1b.

FIG. 2 shows a view along II in FIGS. 1a and 1b. Its shows the representation of the vane 1 when seen as a top view from the free end of the vane or in a plane orthogonal to the longitudinal direction of the vane.

As can be seen in FIGS. 1a, 1b and 2, the three vane parts 3a, 3b, 3c have an aerodynamic profile similar to the aerodynamic profile of a lift surface, namely a profile with a difference in curvature between its top and bottom parts, particularly an approximately flat bottom part and an significantly curved top part. Obviously, the aerodynamic profile of each part of the vane could be different and chosen as a function of the required performances of the turbine machine.

Moreover as can be seen in FIG. 2, the three vane parts 3a, 3b and 3c may be arranged so that together, they define an aerodynamic profile of a conventional stator vane. In particular, the external envelope E in which the vane parts 3a, 3b and 3c are inscribed can define the contour of a conventional stator vane.

The profile can thus comprise a leading edge 9a defined by the first 3a and second 3b vane parts, a relatively thick median section 9b along the extension of the leading edge 9a defined by the first 3a and second 3b vane parts, and a thinner trailing edge 9c thinner than the median section 9b and located along the extension of the median section 9b, the trailing edge 9c being defined by the third vane part 3c. The leading edge 9a is formed by the ends of the first 3a and second 3b vane parts.

The first vane part 3a and the second vane part 3b are superposed on each other to define a separation between the first 3a and the second 3b vane parts forming the air flow stream path 5a. Similarly, the second 3b and third 3c vane parts are superposed relative to each other to define a spacing forming the air flow stream path 5b.

Retaining sections 4a and 4b are provided on each of which the vane part 3a, 3b and 3c are attached in order to mechanically hold the vane parts 3a to 3c to each other. In particular, a first retaining section 4a may be located at mid-height of the stator vane 1 extending in a plane orthogonal to the longitudinal direction of the vane 1, and a second retaining section 4b may be provided at one end of the vane 1 that will be fixed to the remainder of the turbine machine, also extending in a plane orthogonal to the longitudinal direction of the vane 1. Also, although this cannot be seen in FIGS. 1a and 1b, retaining sections could be provided at each end of the stator vane 1.

A retaining section, particularly the median retaining section 4a could thus be used to subdivide part of the vane into two vane parts located on each side of the retaining section.

FIG. 3 shows partial manufacturing of a vane part 3 of the stator vane 1 according to the invention, and particularly manufacturing of circulation means 2 on the vane to enable circulation of lubrication oil.

The surface of the vane part 3 may comprise particularly flow channels 7, for example made by machining the surface of the vane part 3. A cover plate 6 is then fixed to the surface of the vane part 3 so as to cover the channels 7 formed. For example, the cover plate 6 may be fixed by welding, particularly by electron beam welding.

In this way, the surface of the vane part 3 with its flow channels 7 covered by a smooth cover plate 6 can enable the vane part to act like an oil/air type heat exchanger with no fins.

The cover plate 6 may be a metal plate with high thermal conductivity. The vane part 3 may be made of metal, preferably with high thermal conductivity, for example a metal alloy such an aluminium alloy and/or titanium alloy.

The vane part 3 may be any one of the first 3a, second 3b or third 3c vane parts.

Oil can thus flow in the flow channels 7 along the direction of the arrows F1 shown in FIG. 3 and the air flow can pass over the surface of the cover plate 6 along the direction of the arrows F2 shown in FIG. 3.

FIG. 4 shows the stator vane 1 according to the invention comprising oil circulation means 2 provided with oil circulation pipes 8.

Advantageously, the circulation pipes 8 can be used for the distribution of oil in the flow channels 7 described above.

In particular, the flow pipes 8 are distributed on the side surfaces of vane parts 3a to 3c so as to open up into the flow channels 7.

The oil distribution in the flow channels 7 through the pipes 8 may be organised to maximise the average temperature on the surface of the vane parts to obtain a maximum efficiency of the vane 1 acting as a heat exchanger.

The flow pipes 8 may be connected to the lubrication oil circuit of the turbine machine to lead oil into the flow channels 7.

In the example described above, the stator vane 1 is advantageously an outlet guide vane OGV, integrated into an outlet guide vane OGV system, but it could be otherwise. The stator vane 1 could form part of another stage of the turbine machine stator.

In FIGS. 5 to 9, the axis M is the rotation axis of the turbine machine and axis R is the radial axis.

The stator parts 10 and 100 described below with reference to FIGS. 5 to 13 may comprise a stator vane 1 as described above. In particular, stator vanes 20 and 300 described below may be of the stator vane type 1 as described above. They can also be integrated into an outlet guide vane OGV according to the invention.

Figure 5:
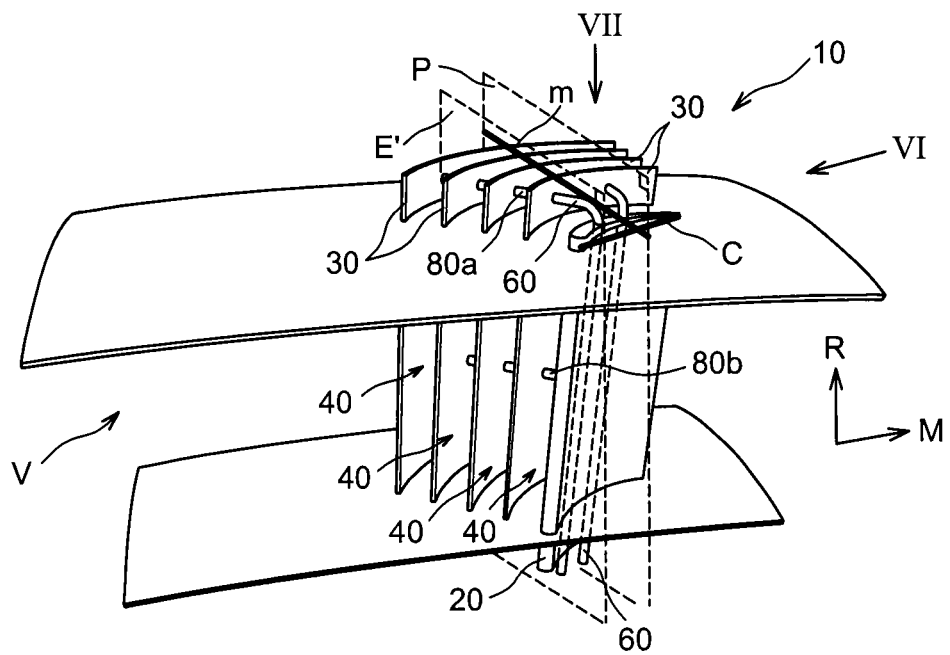
FIG. 5 shows a perspective view of an example stator part according to the invention.

With reference to FIG. 5, the figure shows a perspective view of an example stator part 10 according to the invention.

According to the invention, the stator part 10 comprises a stator vane 20, a set of strips 30 associated with the stator vane 20 and means 60 of circulating a fluid to be cooled, particularly oil from the turbine machine lubrication circuit.

The set of strips 30 comprises four strips 30 that extend in planes parallel to each other and parallel to the plane in which the stator vane 20 extends.

The strips 30 and the stator vane 20 are arranged relative to each other so as to define air flow stream paths 40 between the strips.

The strips 30 are all the same length along the direction of the radial axis R of the turbine machine.

Furthermore, the separation between the strips 30 is constant and the thickness of the strips 30 is also constant.

The circulation means 60 comprise circulation pipes 60 that extend inside the stator vane 20 and that pass through the strips 30.

Figure 6:
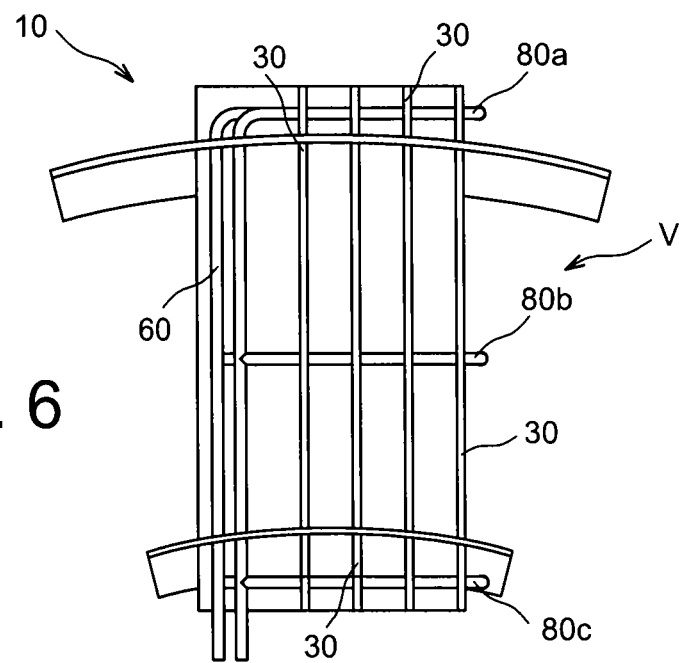
FIGS. 6 and 7 are diagrammatic partial views of the stator part in FIG. 5, along VI and VII respectively.

In particular, as can be seen in FIG. 6 that is a partial view along VI in FIG. 5, the circulation means comprise three stages 80a, 80b and 80c of pipes 60, two stages 80a and 80c of pipes being located at the radial ends of the strips 30 outside the flow stream V to avoid the creation of aerodynamic drag and a median stage 80b being located in the flow stream V.

The means 60 for circulating the fluid to be cooled may be fixed to the strips 30, particularly by welding, so as to transfer a heat flow by conduction.

Figure 7:
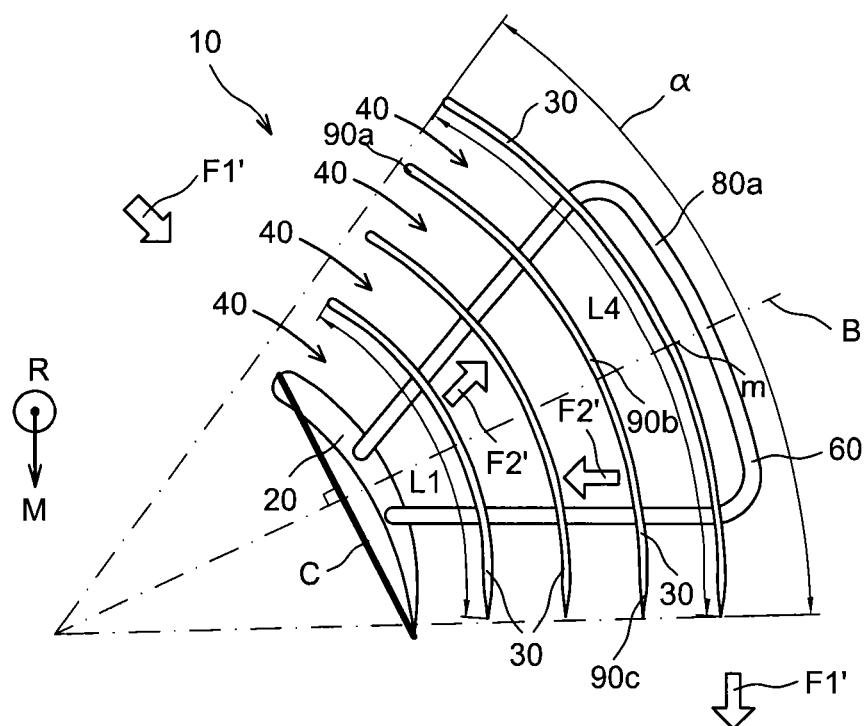

FIG. 7 shows a view along VII of the stator part 10 in FIG. 5.

As can be seen in FIG. 7, each strip 30 has a leading edge 90a, a median section 90b and a trailing edge 90c. The thickness of each strip 30 is approximately constant on the leading edge 90a and the median section 90b, and then decreases on the trailing edge 90c.

Furthermore, as can be seen in FIGS. 5 and 7, the strips 30 are arranged relative to the stator vane 20 such that there is a plane E' passing through the stator vane 20 and the strips 30, the plane E' being parallel to the plane P perpendicular to the chord C of the stator vane 20 and containing the median line m of the chord C of the stator vane 20.

Furthermore, the strips 30 are inscribed in an angular sector a for which the bisector B is coincident with the median line m of the chord C of the stator vane 20.

The pipes 60 containing hot oil to be cooled pass through the strips 30, and oil flows along the direction of the arrows F2'. The air flow also flows along the direction of the arrows F1' between the strips 30 and the stator vane 20 to dissipate heat from the oil.

The interface between the strips 30 and the pipes 60 may be made so as to maximise heat exchange, for example by welding.

The stator part 10 comprises four strips 30, for which the lengths in the orthoradial plane increase as the distance from the stator vane 20 increases. In particular, the length L1 of the strip 30 closest to the stator vane 20 is less than the length L4 of the strip 30 furthest from the stator vane 20.

Figure 8:
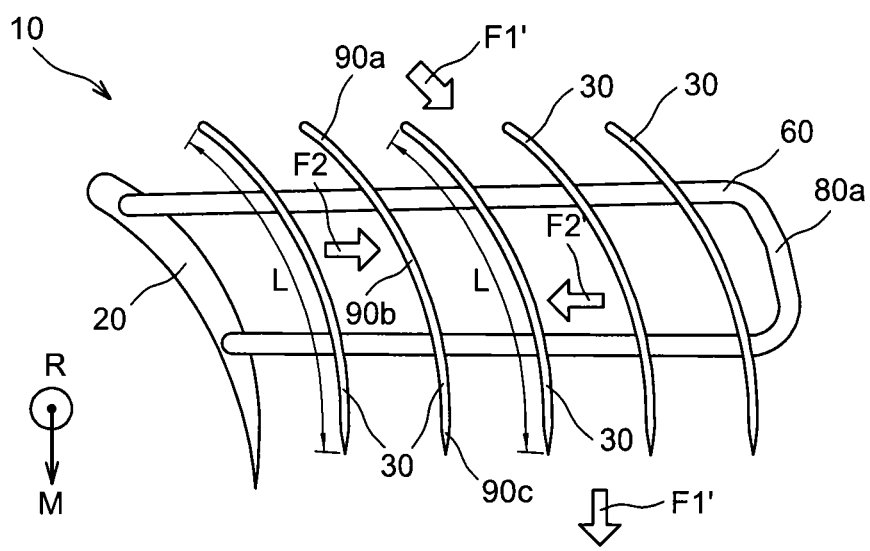
FIG. 8 shows a variant embodiment of the stator part in FIG. 7.

The example in FIG. 8 shows a variant embodiment of a stator part 10 according to the invention. In this example, five strips 30 are associated with the stator vane 20.

The strips 30 are approximately the same length L along the orthoradial plane and are distributed in translation relative to the stator vane 20. Circulation pipes 60 pass through all the strips 30.

The position of the pipes 60 at the radial ends of the strips 30 outside the flow stream avoid the creation of aerodynamic drag. When the efficiency of the stator part 10 is sufficient without the presence of a stage of pipes 60 in the flow stream V, particularly without the presence of the median stage 80b, the circulation means 60 may comprise only the stages 80a and 80c of pipes 60 at the radial ends of the strips 30.

In the examples shown, there are only point contacts between the pipes 60 and the strips 30. As a variant, the pipes 60 may for example be wound around the strips 30 so as to increase the heat exchange area, and thus the heat exchange.

The passage of pipes 60 inside the stator vane 20 can reduce aerodynamic drag.

Figure 9:
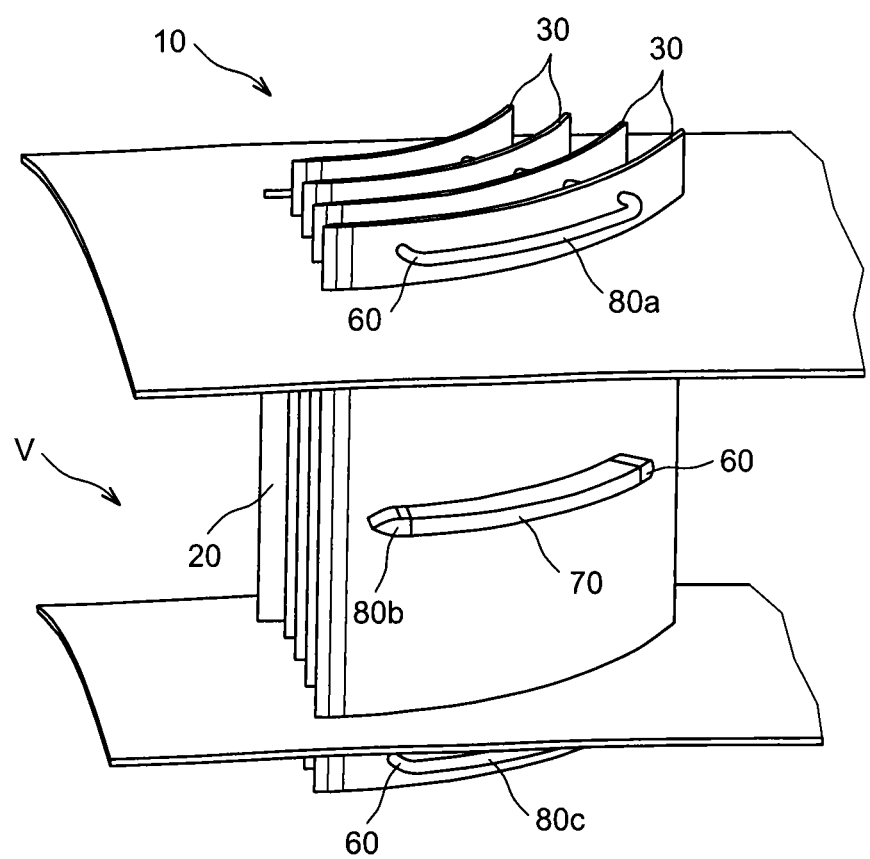
FIG. 9 shows a perspective view of a variant embodiment of the stator part in FIG. 5.

Furthermore, fairing can be provided around the circulation pipes 60 and particularly the different stages of pipes 60 so as to limit aerodynamic drag. In particular, the pipes 60 may be covered by fairing structures 70 as shown in FIG. 9. The fairing structures 70 can also mechanically hold the different strips 30 together.

The pipes 80 may be connected to the turbine machine lubrication oil circuit.

In the examples described above, the stator part 10 is advantageously chosen for a guide part of an outlet guide vane OGV system, but it could be otherwise. The stator part 10 could belong to another stage in the turbine machine stator.

In particular, the stator part 10 according to the invention could be arranged near the upstream end of the turbine machine forward fairing, both in the primary flow and the secondary flow, particularly to replace the outlet guide vane OGV system and the inlet guide vane IGV system. The circulation pipes 60 could then pass entirely outside the stream flow. In such a configuration, the forward fairing can exchange heat, which can enable an increase in heat exchange and for example could deice the forward fairing.

Figure 10:
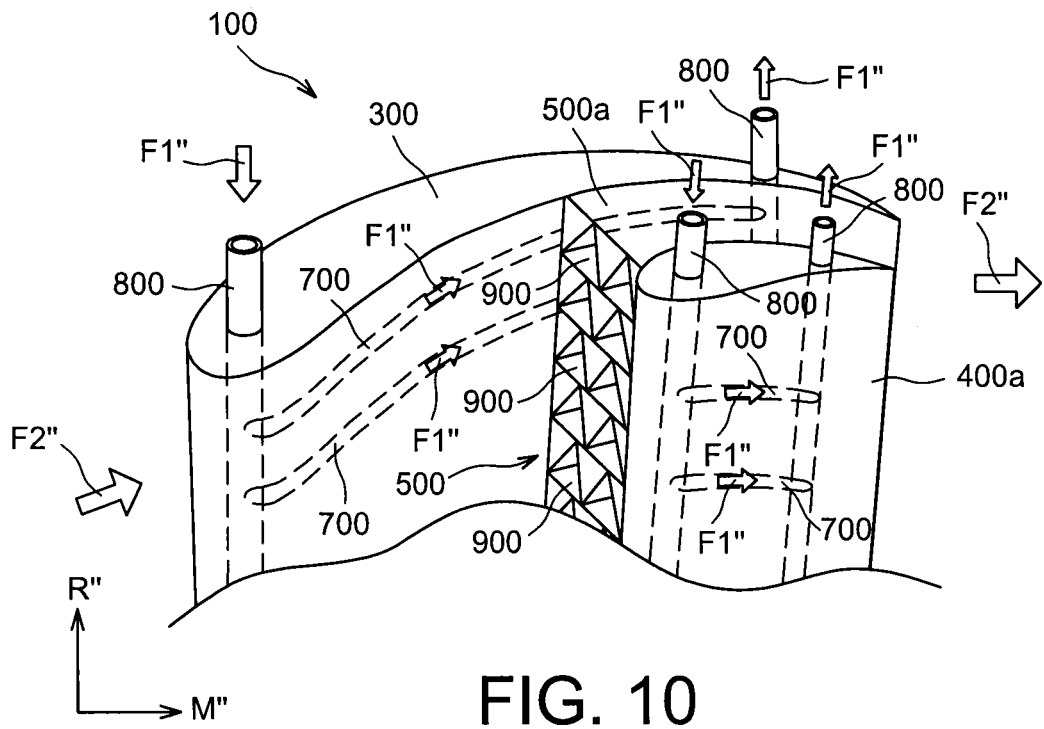
FIG. 10 shows a perspective view of another example stator part according to the invention.

In FIG. 10, the axis M" is the rotation axis of the turbine machine and the axis R" is the radial axis.

With reference to FIG. 10, the figure shows an example of a stator part 100 according to the invention.

The stator part 100 comprises a stator vane 300 and an aerodynamic element 400a, a heat conducting structure 500 being placed between the stator vane 300 and the aerodynamic element 400a.

An air flow represented by the arrows F2" comes into contact with the stator vane 300, the aerodynamic element 400a and the heat conducting structure 500 passing through it.

The stator part 100 also comprises means 200 of circulating a fluid to be cooled, particularly oil, by the heat conducting structure 500 in contact with the air flow.

Means 200 of circulating the oil to be cooled comprise oil flow channels 700 placed inside the stator vane 300 and inside the aerodynamic element 400a, and oil circulation pipes 800 that radially pass inside the stator vane 300 and inside the aerodynamic element 400a and open up onto the internal and external surfaces of the stator vane 300 and the aerodynamic element 400a. Oil circulates inside the flow pipes 800 and inside the flow channels 700 along the direction of the arrows F1".

The heat conducting structure 500 can increase the exchange area on which the air flow flows, and thus increase heat transfer by heat conduction and therefore dissipation of heat from the oil circuit.

The heat conducting structure 500 comprises a set of heat conducting strips 900. These strips 900 are arranged regularly inside the heat conducting structure 500 and form hollow ducts inside which the air flow passes, these ducts having a triangular section in this example.

Figure 12A:
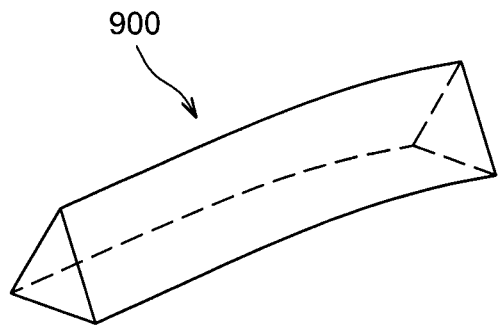
FIGS. 12a and 12b show two examples of channels formed by strips that can be integrated into a heat conducting structure of a stator part according to the invention.
Figure 12B:
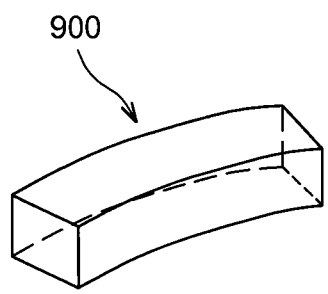

Such an example of strips 900 used in the heat conducting structure 500 of the stator part 100 in FIG. 10 is shown in FIG. 12a. The assembly of strips 900 can thus form a triangular shaped air duct. The strips 900 can also be folded, particularly in accordion fashion, for example to form a duct with a triangular cross-section. Obviously, the strips 900 could be of any type. For example, FIG. 12b shows strips 900 forming a hollow curved duct with a rectangular cross-section. In particular, if the strips 900 are all horizontal (orthoradial), this rectangular shaped duct will extend over the entire width of the heat conducting structure 500.

The strips 900 advantageously comprise a material with good heat conduction properties, since they are particularly made from metal.

The heat conducting structure 500 is also closed by an external surface 500a and an internal surface (only the external surface 500a is shown in FIG. 10).

The external surface 500a extends in the external plane containing the external surfaces of the stator vane 300 and the aerodynamic element 400a, and the internal surface extends in the internal plane containing the internal surfaces of the stator vane 300 and the aerodynamic element 400a.

The stator vane 300 corresponds to a conventional stator vane of a turbine machine, and particularly an outlet guide vane OGV.

The aerodynamic profile of the aerodynamic element 400a is approximately the same as that of a conventional stator vane comprising a leading edge, a relatively thick median section and a thinner trailing edge.

The aerodynamic element 400a is superposed orthoradially on the stator vane 300.

Figure 11:
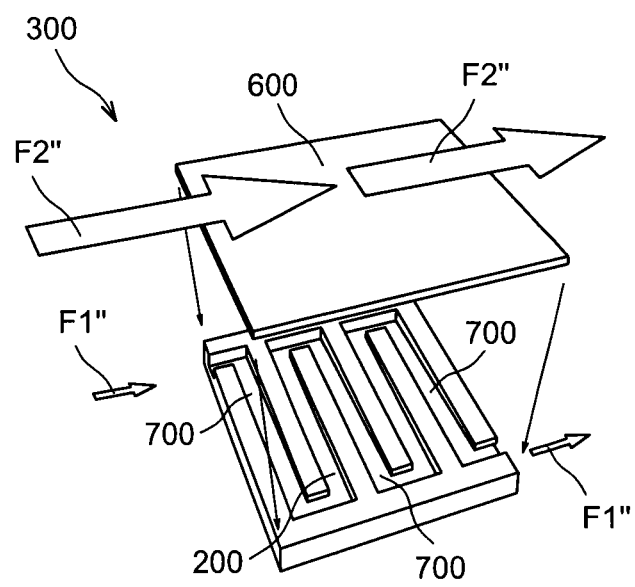
FIG. 11 shows partial manufacturing of a stator vane of a stator part according to the invention for the installation of means of circulating a fluid to be cooled.

FIG. 11 shows partial manufacturing of a stator vane 300 of a stator part 100 according to the invention, and particularly manufacturing of circulation means 200 on the vane 300 for circulation of the lubrication oil.

The surface of the stator vane 300 may particularly comprise flow channels 700, for example made by machining the surface of the vane 300. A cover plate 600 is then fixed on the surface of the vane 300 so as to cover the channels 700 formed. The cover plate 600 may for example be fixed by welding, particularly by electron beam welding.

In this way, the surface of the vane 300 provided with the flow channels 700 covered by a smooth cover plate 600 enables the blade 300 to act like an oil/air type heat exchanger without fins.

The cover plate 600 may be a metal plate with good thermal conductivity. The vane 300 may be made of metal, preferably with good heat conduction properties, for example a metal alloy such as an aluminium alloy and/or a titanium alloy.

Oil can thus flow in the flow channels 700 along the direction of the arrows F1" shown in FIGS. 10 and 11 and the air flow may follow the surface of the cover plate 600 along the direction of the arrows F2" shown in FIG. 11.

Although FIG. 11 shows partial manufacturing of the stator vane 300, the characteristics described above may similarly be applied to partial manufacturing of the aerodynamic element of the stator part 100.

Figure 13:
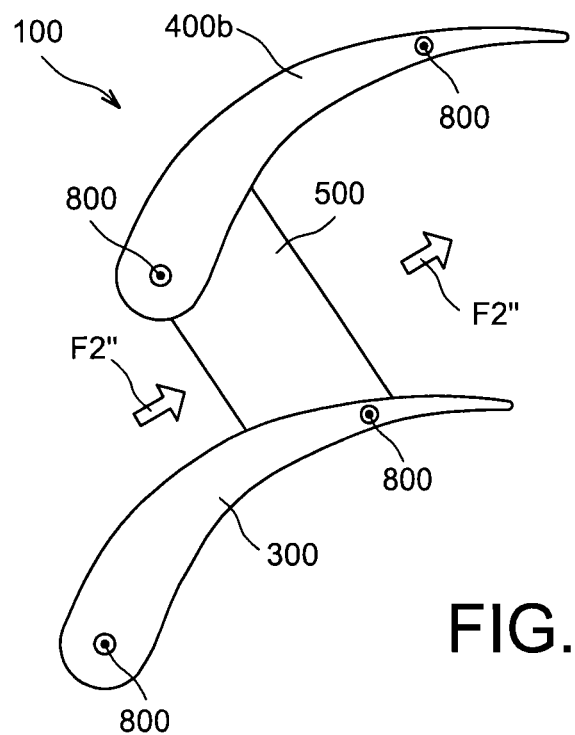
FIG. 13 shows another example stator part according to the invention, when observed in an orthoradial plane.

FIG. 13 shows another example embodiment of a stator part 100 according to the invention.

In this example, the stator vane forms a first stator vane 300 and the aerodynamic element forms a second stator vane 400b adjacent to the first stator vane 300.

In particular, the first stator vane 300 and the second stator vane 400b are adjacent stator vanes in the same vane system, for example an outlet guide vane OGV system.

The heat conducting structure 500 is fixed between the first stator vane 300 and the second stator vane 400b.

Manufacturing of a stator part 100 according to the invention from a first stator vane 300 and a second stator vane 400b arranged adjacent to each other on the same vane system, between which a heat conducting structure 500 is mounted comprising strips 900, can easily and quickly increase the heat dissipation capacity.

The heat conducting structure 500 of the stator part 100 in FIG. 13 may include strips 900 forming any type of channels, for example like those shown in FIGS. 12a and 12b. The curvature of the channels may be similar to the curvature of the first stator vane 300 and/or the second stator vane 400b.

In the examples described above, the stator part 100 is advantageously integrated into an outlet guide vane OGV, but it could be otherwise. The stator part 100 could form part of another stage of the turbine machine stator.

Obviously, the invention is not limited to the example embodiments that have just been disclosed. Various modifications can be made by those skilled in the art.

In particular, the circulation means 2 of the fluid to be cooled may be of any type and may be different from a system comprising flow channels 7 and flow pipes 8. For example, the fluid circulation means may be arranged to enable conduction of heat from the core of vane parts towards the surface.

The circulation means 2 may not have any flow pipes 8. For example, the fluid to be cooled can circulate only in the vane parts, for example in the flow ducts 7. The circulation means 2 of the fluid to be cooled may be independent from the vane parts 3a to 3c. In particular, the stator vane 1 may be configured such that the fluid to be cooled, and particularly oil, cannot circulate in vane parts. The circulation means 2 may for example comprise a heat duct, for example positioned at least on the surface of one or several vane parts, arranged to transport heat from one or several ends of one or several vane parts towards their surface, this heat transfer by heat duct being possible particularly due to the principle of heat transfer by fluid phase transition. The use of a correctly sized heat duct in combination with vane parts can give higher thermal conductivity than is possible with a usual metal, for example aluminium, which will allow higher heat dissipation than is possible with simple conduction.

The distribution of strips 30 may be different depending on the required performances for the stator part. Their shape and/or orientation can also vary.

The turbine machine oil circuit may be made so as to prevent the radial path of one or several pipes 60 in the flow stream, and so as to reduce the thickness of the stator part. For example, a ring of pipes 60 may be provided in the internal and external flow streams. Thus, it would not be necessary to have a thick stator vane 20, that would then reduce aerodynamic drag.

A coolant other than oil could be used for the path of pipes in the flow stream, particularly to prevent loss of lubrication in the case of a pipe break. For example an oil/coolant exchanger may be added.

The circulation means 200 of the fluid to be cooled may be independent of the stator vane 300 and/or the aerodynamic element 400a or 400b. In particular, the stator vane 300 and/or the aerodynamic element 400a or 400b may be configured such that the fluid to be cooled, particularly oil, cannot circulate inside the stator vane 300 and/or the aerodynamic element 400a or 400b. For example, the circulation means 200 may comprise a heat duct, for example placed on at least one surface of the stator vane 300 and/or the aerodynamic element 400a or 400b, arranged to transport heat from one or several ends of the stator vane 300 and/or the aerodynamic element 400a or 400b to their surface, this heat transfer by heat duct being possible particularly due to the principle of heat transfer by fluid phase transition. The use of a correctly sized heat duct in combination with the stator vane 300 and/or the aerodynamic element 400a or 400b can give better thermal conductivity than is possible with a usual metal, for example aluminium, which can enable better heat conduction than is possible by simple conduction.

A coolant other than oil could be used to prevent the oil path in the stator vane 300 and/or the aerodynamic element 400a or 400b, particularly to avoid loss of lubrication in the case of a break of the stator vane 300 and/or the aerodynamic element 400a or 400b in flight. For example, an oil/coolant exchanger could be added.

The expression "comprising a" should be understood as being synonymous with "comprising at least one", unless specified otherwise.

The invention claimed is:

1. An outlet guide vane system comprising:
    a stator vane for a turbine machine, the stator vane comprising
        a set of at least two vane parts arranged relative to each other to define air flow stream paths between the at least two vane parts; and
        means for circulating the fluid to be cooled by the air flow, the means for circulating being embedded in the at least two vane parts,
    wherein the stator vane is an outlet guide vane of the outlet guide vane system,
    wherein the at least two vane parts are arranged such that when observed in a plane orthogonal to the longitudinal direction of the stator vane, an aerodynamic profile of the stator vane is almost identical to an aerodynamic profile of a second, reference stator vane comprising a leading edge, a median section, and a trailing edge,
    wherein the at least two vane parts comprises first, second, and third vane parts, the first and second vane parts combined defining the leading edge and the median section of the aerodynamic profile of the stator vane, the leading edge being formed by ends of the first and second vane parts, the third vane part defining the trailing edge of the aerodynamic profile of the stator vane, a downstream end of the first vane part being upstream of a downstream end of the second vane part, and the downstream end of the second vane part being upstream of a downstream end of the third vane part,
    wherein the first vane part and the second vane part are superposed on each other to define a first separation therebetween forming a first air flow stream path, and the second vane part and the third vane part are superposed relative to each other to define a second separation therebetween forming a second air flow stream path,
    wherein, for each of the first and second air flow stream paths, an inlet of the air flow stream path is further upstream than an outlet of the air flow stream path,
    wherein the inlet of the first air flow stream path is at a furthest upstream portion of the stator vane, and
    wherein the means for circulating the fluid to be cooled comprises fluid circulation pipes located on at least a portion of the at least two vane parts, a portion of the circulation pipes extending radially outside of the at least two vane parts.

2. The outlet guide vane system according to claim 1, wherein at least one vane part has approximately a same aerodynamic profile as a lift surface.

3. The outlet guide vane system according to claim 1, wherein the stator vane comprises one or plural support sections, distributed over a height of the vane, to mechanically retain the at least two vane parts to each other.

4. The outlet guide vane system according to claim 1, wherein the means for circulating the fluid to be cooled comprises fluid flow channels formed on at least part of the stator vane covered by a cover plate defining an external surface of the at least two vane parts.

5. The outlet guide vane system according to claim 4, wherein the fluid circulation pipes enable fluid distribution in the flow channels.

6. A turbine machine comprising an outlet guide vane system according to claim 1.

7. The outlet guide vane system according to claim 1, wherein the leading edge is formed by ends of the first and second vane parts.

8. The outlet guide vane system according to claim 1, wherein the median section is thicker than the leading edge, and wherein the trailing edge is thinner than the leading edge.

* * * * *